United States Patent
Nakamura et al.

(10) Patent No.: US 10,079,036 B2
(45) Date of Patent: *Sep. 18, 2018

(54) MAGNETIC RECORDING MEDIUM AND MAGNETIC RECORDING AND REPRODUCING APPARATUS

(71) Applicant: SHOWA DENKO K.K., Tokyo (JP)

(72) Inventors: Satoru Nakamura, Hsinchu (TW); Taining Hung, Hsinchu (TW); Evance Kuo, Hsinchu (TW); Daizo Endo, Ichihara (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/202,674

(22) Filed: Jul. 6, 2016

(65) Prior Publication Data

US 2017/0011765 A1 Jan. 12, 2017

(30) Foreign Application Priority Data

Jul. 8, 2015 (JP) ................. 2015-136832
Feb. 29, 2016 (JP) ................. 2016-038320

(51) Int. Cl.
*G11B 5/65* (2006.01)
*G11B 5/725* (2006.01)
*G11B 5/72* (2006.01)

(52) U.S. Cl.
CPC ........... *G11B 5/725* (2013.01); *G11B 5/72* (2013.01)

(58) Field of Classification Search
CPC ........... C10M 107/38; C10M 2213/00; C10M 2213/04; C10M 2213/043; C10M 2213/06;

(Continued)

(56) References Cited

U.S. PATENT DOCUMENTS 6,136,403 A 10/2000 Prabhakara et al.
6,875,492 B1 * 4/2005 Pirzada ............... G11B 5/72
428/216

(Continued)

FOREIGN PATENT DOCUMENTS

CN 101121908 A 2/2008
CN 102356431 A 2/2012

(Continued)

OTHER PUBLICATIONS

An Office Action dated Feb. 13, 2018, which issued during the prosecution of U.S. Appl. No. 15/044,529.

(Continued)

*Primary Examiner* — Holly Rickman
(74) *Attorney, Agent, or Firm* — Sughrue Mion, PLLC

(57) ABSTRACT

A magnetic recording medium 11 in which the outermost surface of a protective layer 3 on a lubricant layer 4 side contains carbon and nitrogen of 10 atomic % to 90 atomic %, the lubricant layer 4 is formed by being in contact with the outermost surface, and contains a compound A of Formula (1) and a compound B of Formula (2), a mass ratio (A/B) of the compound A with respect to the compound B is 0.2 to 0.3, the average molecular weights of the compounds A and B are 1,500 to 2,000 and 1,300 to 2,400, respectively, and the average film thickness is 0.5 nm to 2 nm.

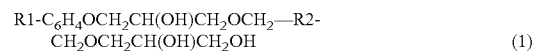

(R1 is an alkoxy group having 1 to 4 carbon atoms. R2 is $-CF_2O(CF_2CF_2O)x(CF_2O)yCF_2-$).

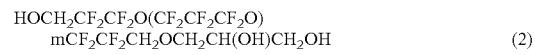

2 Claims, 1 Drawing Sheet

(58) Field of Classification Search
CPC ........... C10M 2213/0606; G11B 5/725; C10N 2040/18; C10N 2240/204
See application file for complete search history.

(56) References Cited

U.S. PATENT DOCUMENTS

| | | | |
|---|---|---|---|
| 2011/0064970 A1* | 3/2011 | Chen .................... | C10M 157/10 428/833 |
| 2013/0083422 A1 | 4/2013 | Ooeda et al. | |
| 2013/0209837 A1* | 8/2013 | Sagata ................... | G11B 5/725 428/833 |
| 2014/0139946 A1 | 5/2014 | Ota | |
| 2014/0212692 A1* | 7/2014 | Matsumoto .......... | C10M 169/04 428/832 |
| 2016/0240219 A1 | 8/2016 | Maruyama et al. | |
| 2017/0011765 A1 | 1/2017 | Nakamura et al. | |

FOREIGN PATENT DOCUMENTS

| | | |
|---|---|---|
| CN | 107004430 A | 8/2017 |
| JP | 62-66417 A | 3/1987 |
| JP | 02010518 A | 1/1990 |
| JP | H06-333231 A | 12/1994 |
| JP | 09171615 A | 6/1997 |
| JP | 9-282642 A | 10/1997 |
| JP | 09288818 A | 11/1997 |
| JP | 10049853 A | 2/1998 |
| JP | 2002-275484 A | 9/2002 |
| JP | 2005-122790 A | 5/2005 |
| JP | 2009-211765 A | 9/2009 |
| JP | 2010-108583 A | 5/2010 |
| JP | 2013-157048 A | 8/2013 |
| JP | 2013-163667 A | 8/2013 |
| JP | 2014-116060 A | 6/2014 |

OTHER PUBLICATIONS

An Office Action dated Mar. 30, 2018, which issued during the prosecution of U.S. Appl. No. 15/264,988.
Communication dated May 12, 2015, from Japanese Patent Office in counterpart application No. 2015-029178.
Communication dated Apr. 4, 2018 from the State Intellectual Property Office of the P.R.C. in counterpart Application No. 201610088013.8.
Communication dated May 22, 2018, issued by the Japan Patent Office in corresponding Japanese Application No. 2015-134652.
Communication dated Jun. 28, 2018, issued by the State Intellectual Property Office of the P.R.C in Chinese Application No. 201610487247.X.

* cited by examiner

MAGNETIC RECORDING MEDIUM AND MAGNETIC RECORDING AND REPRODUCING APPARATUS

BACKGROUND OF THE INVENTION

Field of the Invention

The present invention relates to a magnetic recording medium which is preferably used in a magnetic recording and reproducing apparatus such as a hard disk drive, and a magnetic recording and reproducing apparatus including the magnetic recording medium.

Priority is claimed on Japanese Patent Application No. 2015-136832, filed on Jul. 8, 2015 and Japanese Patent Application No. 2016-038320, filed on Feb. 29, 2016, the content of which is incorporated herein by reference.

Description of Related Art

In order to improve recording density of a magnetic recording and reproducing apparatus, a magnetic recording medium suitable for high recording density has been developed.

Examples of the magnetic recording medium include a magnetic recording medium in which a magnetic layer recording information, a protective layer formed of carbon or the like, and a lubricant layer are formed on a substrate for a magnetic recording medium in this order.

The protective layer protects the information recorded on the magnetic layer and increases slidability of a magnetic head with respect to the magnetic recording medium. However, it is not possible to obtain sufficient durability of the magnetic recording medium only by disposing the protective layer on the magnetic layer.

For this reason, in general, the lubricant layer is formed by applying a lubricant onto the surface of the protective layer, and thus, the durability of the magnetic recording medium is improved. By disposing a lubricant layer, it is possible to prevent the magnetic head of the magnetic recording and reproducing apparatus from being directly in contact with the protective layer. In addition, by disposing the lubricant layer, a frictional force between the magnetic recording medium and the magnetic head sliding on the magnetic recording medium is significantly reduced. In addition, the lubricant layer has a function of preventing the magnetic layer or the like of the magnetic recording medium from being corroded due to impurities entering from the surrounding environment.

In the related art, examples of the lubricant used in the lubricant layer of the magnetic recording medium include a perfluoropolyether-based lubricant, an aliphatic hydrocarbon-based lubricant, and the like.

For example, in Patent Document 1, a magnetic recording medium is disclosed in which a lubricant of perfluoroalkyl polyether having a structure of $HOCH_2$—$CF_2O$—$(C_2F_4O)$p-$(CF_2O)$q-$CH_2OH$ (p and q are integers.) is applied onto a carbon protective film.

In Patent Document 2, a magnetic recording medium is disclosed onto which a lubricant formed of perfluoroalkyl polyether (tetraol) denoted by $HOCH_2CH(OH)$—$CH_2OCH_2CF_2O$—$(C_2F_4O)$p-$(CF_2O)$q-$CF_2CH_2OCH_2$—$CH(OH)CH_2OH$ (p and q are an integer.) is applied.

In Patent Document 3, a magnetic recording medium including a lubricant layer in which a phosphazene compound and a compound having perfluorooxy alkylene unit are mixed in a specific range is disclosed. In addition, in Patent Document 3, it is disclosed that the lubricant layer has a high bonding force with respect to the protective layer, and even in a case where the layer thickness of the protective layer decreases, a high coating ratio can be obtained.

In Patent Document 4, a lubricant containing a compound denoted by $R^1$—$C_6H_4O$—$CH_2CH(OH)CH_2OCH_2$—$R^2$—$CH_2$—$O$—$R^3$ is disclosed.

PRIOR ART DOCUMENTS

Patent Documents

[Patent Document 1] Japanese Unexamined Patent Application, First Publication No. S62-66417
[Patent Document 2] Japanese Unexamined Patent Application, First Publication No. H9-282642
[Patent Document 3] Japanese Unexamined Patent Application, First Publication No. 2010-108583
[Patent Document 4] Japanese Unexamined Patent Application, First Publication No. 2013-163667

SUMMARY OF THE INVENTION

In the magnetic recording and reproducing apparatus, recording density is required to be improved by further decreasing a floating amount of the magnetic head. For this reason, the thickness of the lubricant layer is required to be further thinned.

However, in a case that the thickness of the lubricant layer is thinned, a gap is formed in the lubricant layer, and covering properties with respect to the protective layer decrease, and thus, the magnetic recording medium is easily contaminated. In addition, in a case where the thickness of the lubricant layer is thinned, covering properties and bonding properties with respect to the surface of the protective layer easily decrease. For this reason, the environment resistance of the lubricant layer becomes insufficient, and thus, the durability of the magnetic recording medium may not be sufficiently obtained.

The present invention has been made in consideration of the circumstances described above, and an object of the present invention is to provide a magnetic recording medium including a lubricant layer in which high covering properties and high bonding properties with respect to the surface of a protective layer are obtained for a long period of time even in a case where the thickness is sufficiently thinned, and a magnetic recording and reproducing apparatus including the magnetic recording medium.

In order to attain the object of the present invention, the present inventors have performed intensive studies as follows.

That is, it is known that a compound used as a material of a lubricant layer has high bonding properties with respect to a protective layer formed of carbon or the like as the number of OH groups contained in the molecular structure thereof becomes greater. For this reason, in the related art, the number of OH groups contained in the compound used in the lubricant layer tends to be increased by 2, 4, 6, and 8.

However, as a result of the studies of the present inventors, it has been found that, in a case where the number of OH groups in the compound increases, surface energy of the magnetic recording medium including the lubricant layer containing the compound tends to be increased by a mutual interaction between the OH groups. In addition, in a case where the number of OH groups in the compound increases, the molecular weight of the compound tends to be increased. For this reason, viscosity of the lubricant containing the compound increases, coating properties of the lubricant decrease, and the lubricant layer formed by being coated with the lubricant is highly likely to be in the shape of an island or a mesh.

Therefore, in order to optimize the material of the lubricant layer, the present inventors have performed experiments, focusing on surface energy of the magnetic recording medium. That is, in the related art, examples of means for evaluating covering properties of the lubricant layer formed on the surface of the magnetic recording medium include only an indirect method in which the lubricant layer is formed on the magnetic layer, and corrosion resistance is evaluated under a high temperature and high humidity environment. This is because the lubricant layer of the magnetic recording medium is thin as approximately 1 nm, and thus, it is difficult to perform direct analysis. Thus, it is difficult to optimize the material of the lubricant layer. In contrast, the present inventors have found that it is preferable that total surface energy (hereinafter, referred to as "$\gamma^{total}$") on the surface of the magnetic recording medium is obtained by calculation, and a lubricant layer having a sufficiently low $\gamma^{total}$ is formed.

In a case where a parameter indicating bonding properties between the lubricant layer and the protective layer is set to $\gamma^{AB}$, and a parameter indicating covering properties of the lubricant is set to $\gamma^{LW}$, the surface energy ($\gamma^{total}$) can be indicated by the total value of $\gamma^{AB}$ and $\gamma^{LW}$ ($\gamma^{total}=\gamma^{AB}+\gamma^{LW}$ (the unit of $\gamma^{total}$, $\gamma^{AB}$, and $\gamma^{LW}$ is mJ/m$^2$.)). $\gamma^{AB}$ and $\gamma^{LW}$, for example, can be calculated by a method disclosed in The Measurement of Surface Energy of Polymers by Means of Contact Angles of Liquids on Solid Surfaces (2004, Finn Knut Hansen, University of Oslo). The bonding properties increase as $\gamma^{AB}$ becomes lower, and the covering properties increase as $\gamma^{LW}$ becomes lower.

Therefore, as $\gamma\gamma^{AB}$ and $\gamma^{LW}$ of the lubricant layer become lower (that is, the surface energy ($\gamma^{total}$) becomes lower), it is difficult to form the lubricant layer to be in the shape of an island or a mesh even in a case where the lubricant layer is thin, and the lubricant layer has high covering properties and bonding properties with respect to the surface of a protective layer.

The present inventors have repeatedly studied the surface of the protective layer arranged by being in contact with the lubricant layer and a material from which the lubricant layer having low surface energy ($\gamma^{total}$) can be obtained. As a result thereof, it has been found that the protective layer and the lubricant layer may be set to the following.

That is, a protective layer in which the outermost surface on a lubricant layer side contains carbon and nitrogen in a range of 10 atomic % to 90 atomic % is used as the protective layer. In addition, a lubricant layer which contains a compound A described below and a compound B described below at a predetermined ratio, and has a predetermined film thickness is used as the lubricant layer. Thus, it has been confirmed that a lubricant layer is obtained in which surface energy ($\gamma^{total}$) is low, and high covering properties and high bonding properties with respect to the surface of the protective layer can be maintained for a long period of time even in a case where the thickness is sufficiently thinned, and the present invention described below has been completed.

[1] According to an aspect of the present invention, there is provided a magnetic recording medium including at least a magnetic layer, a protective layer, and a lubricant layer on a nonmagnetic substrate in this order, in which an outermost surface of the protective layer on the lubricant layer side contains carbon and nitrogen in a range of 10 atomic % to 90 atomic %, the lubricant layer is formed by being in contact with the outermost surface, has an average film thickness of 0.5 nm to 2 nm, and contains a compound A represented in the below general formula (1) which has an average molecular weight in a range of 1,500 to 2,000 and a compound B represented in the below general formula (2) which has an average molecular weight in a range of 1,300 to 2,400, and a mass ratio (A/B) of the compound A with respect to the compound B is in a range of 0.2 to 3.0.

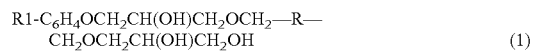

R1-C$_6$H$_4$OCH$_2$CH(OH)CH$_2$OCH$_2$—R— CH$_2$OCH$_2$CH(OH)CH$_2$OH  (1)

(In the general formula (1), R1 is an alkoxy group having 1 to 4 carbon atoms. R2 is —CF$_2$O(CF$_2$CF$_2$O)x(CF$_2$O)$_y$CF$_2$— (an order in parentheses of x and y may be this order, the opposite order, or a random order (each of x and y is a real number of 0 to 15)).)

HOCH$_2$CF$_2$CF$_2$O(CF$_2$CF$_2$CF$_2$O) mCF$_2$CF$_2$CH$_2$OCH$_2$CH(OH)CH$_2$OH  (2)

(In the general formula (2), m is an integer.)

[2] According to another aspect of the present invention, there is provided a magnetic recording and reproducing apparatus, including: the magnetic recording medium according to [1]; a medium-driving unit that drives the magnetic recording medium in a recording direction; a magnetic head that performs recording and reproducing of information on the magnetic recording medium; a head-moving unit that moves the magnetic head relative to the magnetic recording medium; and a recording and reproducing signal-processing unit that performs a recording signal to the magnetic head and a reproducing signal from the magnetic head.

The magnetic recording medium of the present invention includes the protective layer in which the outermost surface (outermost layer) on the lubricant layer side contains carbon and nitrogen in a range of 10 atomic % to 90 atomic %, and the lubricant layer which is formed by being in contact with the outermost surface of the protective layer, has a preferred number of functional groups and six-membered rings, and contains the compound A and the compound B in a preferred average molecular weight range at a predetermined ratio. For this reason, in the magnetic recording medium of the present invention, it is possible to maintain high covering properties and high bonding properties with respect to the surface of the protective layer for a long period of time by the thin lubricant layer in which the average film thickness is in a range of 0.5 nm to 2 nm. Therefore, even in a case where the magnetic recording medium of the present invention is used for a long period of time, the magnetic recording medium is rarely contaminated by an environment substance entering from a gap of the lubricant layer, and thus, durability under a high temperature and high humidity environment becomes excellent. Accordingly, in the magnetic recording medium of the present invention, the thickness of the lubricant layer is sufficiently thinned, and thus, it is possible to correspond to further improvement in recording density.

In addition, the magnetic recording and reproducing apparatus of the present invention includes the magnetic recording medium of the present invention which is rarely contaminated. For this reason, in the magnetic recording and reproducing apparatus of the present invention, a contaminant existing on the magnetic recording medium is transferred onto the magnetic head of the magnetic recording and reproducing apparatus, and thus, it is possible to prevent recording and reproducing properties from decreasing or floating stability from deteriorating. Accordingly, the magnetic recording and reproducing apparatus of the present invention has stable magnetic recording and reproducing properties for a long period of time.

DETAILED DESCRIPTION OF THE INVENTION

Hereinafter, a magnetic recording medium and a magnetic recording and reproducing apparatus of the present invention will be described in detail by using the drawings. Furthermore, the present invention is not limited only to the following embodiments.

[Magnetic Recording Medium]

Figure 1:
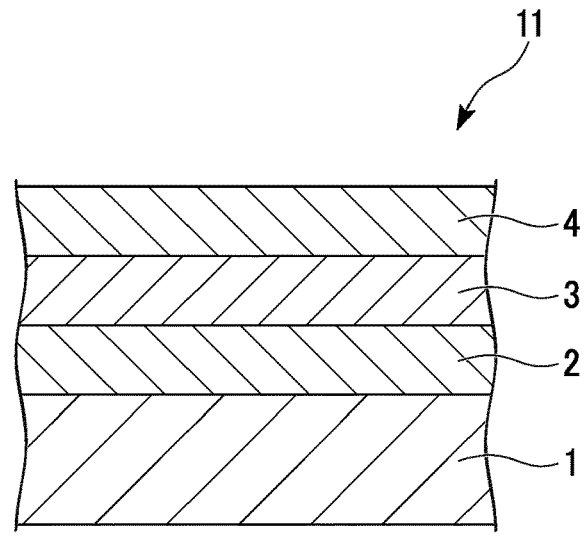
FIG. 1 is a schematic sectional view illustrating an example of a magnetic recording medium of the present invention.

FIG. 1 is a schematic sectional view illustrating an example of a magnetic recording medium according to an embodiment of the present invention.

As illustrated in FIG. 1, in a magnetic recording medium 11 of this embodiment, a magnetic layer 2, a protective layer 3, and a lubricant layer 4 are laminated on a nonmagnetic substrate 1 in this order.

In this embodiment, a case where an adhesive layer (not illustrated), a soft magnetic underlayer (not illustrated), a seed layer (not illustrated), and an orientation control layer (not illustrated) are laminated between the nonmagnetic substrate 1 and the magnetic layer 2 in this order will be described as an example. The adhesive layer, the soft magnetic underlayer, the seed layer, and the orientation control layer are disposed, as necessary, part of these layers do not have to be disposed, and all of these layers do not have to be disposed.

A nonmagnetic substrate in which a film formed of NiP or a NiP alloy is formed on a substrate formed of a metal material such as Al or an alloy material such as an Al alloy, and the like can be used as the nonmagnetic substrate 1. In addition, a nonmagnetic substrate formed of a non-metal material such as glass, ceramic, silicon, silicon carbide, carbon, and a resin may be used as the nonmagnetic substrate 1, and a nonmagnetic substrate in which a film formed of NiP or an NiP alloy is formed on a substrate formed of a non-metal material may be used as the nonmagnetic substrate 1.

In a case where the nonmagnetic substrate 1 is arranged in contact with the soft magnetic underlayer disposed on the adhesive layer, the adhesive layer prevents corrosion of the nonmagnetic substrate 1 from progressing. For example, Cr, a Cr alloy, Ti, a Ti alloy, and the like can be suitably selected as the material of the adhesive layer. It is preferable that the thickness of the adhesive layer is greater than or equal to 2 nm such that an effect which is obtained by disposing the adhesive layer becomes sufficient.

The adhesive layer, for example, can be formed by a sputtering method.

It is preferable that the soft magnetic underlayer has a structure in which a first soft magnetic film, an intermediate layer formed of a Ru film, and a second soft magnetic film are laminated in this order. That is, it is preferable that the soft magnetic underlayer has a structure in which the soft magnetic films on and under the intermediate layer are subjected to antiferromagnetic coupling (AFC) by interposing the intermediate layer formed of the Ru film between the two soft magnetic films. The soft magnetic underlayer has a structure in which the AFC coupling is performed, and thus, it is possible to increase resistance with respect to a magnetic field from the outside and resistance with respect to a Wide Area Tack Erasure (WATE) phenomenon which is a problem peculiar to vertical magnetic recording.

The film thickness of the soft magnetic underlayer is preferably in a range of 15 nm to 80 nm, and is more preferably in a range of 20 nm to 50 nm. In a case where the film thickness of the soft magnetic underlayer is less than 15 nm, the magnetic flux from a magnetic head is not able to be sufficiently absorbed, writing becomes insufficient, and recording and reproducing properties may deteriorate. Therefore, setting the film thickness of the soft magnetic underlayer to be less than 15 nm is not preferable. In contrast, in a case where the film thickness of the soft magnetic underlayer is greater than 80 nm, productivity significantly decreases. Therefore, setting the film thickness of the soft magnetic underlayer to be greater than 80 nm is not preferable.

It is preferable that the first soft magnetic film and the second soft magnetic film are formed of a CoFe alloy. In a case where the first soft magnetic film and the second soft magnetic film are formed of a CoFe alloy, high saturated magnetic flux density Bs (greater than or equal to 1.4(T)) can be realized. In addition, it is preferable that any one or more types of Zr, Ta, and Nb is added to the CoFe alloy used in the first soft magnetic film and the second soft magnetic film. Accordingly, amorphization of the first soft magnetic film and the second soft magnetic film is accelerated, the orientation of the seed layer formed on the soft magnetic underlayer can be improved, and the floating amount of the magnetic head can be reduced.

The soft magnetic underlayer, for example, can be formed by a sputtering method.

The seed layer controls the alignment and the crystal size of the orientation control layer and the magnetic layer 2 disposed on the seed layer. By disposing the seed layer, a vertical directional component with respect to a substrate surface of a magnetic flux generated from the magnetic head increases, and a magnetization direction of the magnetic layer 2 is more strongly fixed in a direction vertical to the nonmagnetic substrate 1.

It is preferable that the seed layer is formed of a NiW alloy. In a case where the seed layer is formed of the NiW alloy, as necessary, other elements such as B, Mn, Ru, Pt, Mo, and Ta may be added to the NiW alloy.

It is preferable that the film thickness of the seed layer is in a range of 2 nm to 20 nm. In a case where the film thickness of the seed layer is less than 2 nm, an effect which is obtained by disposing the seed layer may become insufficient. On the other hand, it is not preferable that a case where the film thickness of the seed layer is greater than 20 nm since the crystal size increases.

The seed layer, for example, can be formed by a sputtering method.

The orientation control layer controls the alignment of the magnetic layer 2 such that the alignment becomes excellent. It is preferable that the orientation control layer is formed of Ru or a Ru alloy.

It is preferable that the film thickness of the orientation control layer is in a range of 5 nm to 30 nm. By setting the film thickness of the orientation control layer to be less than or equal to 30 nm, it is possible to decrease a distance between the magnetic head and the soft magnetic underlayer, and it is possible to make the magnetic flux from the magnetic head steep. In addition, by setting the film thickness of the orientation control layer to be greater than or equal to 5 nm, it is possible to control the alignment of the magnetic layer 2 such that the alignment becomes excellent.

The orientation control layer may be formed of one layer, or may be formed of a plurality of layers. In a case where the orientation control layer is formed of a plurality of layers, all of the orientation control layers may be formed of the same material, or at least a part of the orientation control layers may be formed of a different material.

The orientation control layer can be formed by a sputtering method.

The magnetic layer 2 is formed of a magnetic film in which an easy axis of magnetization (magnetic easy axis) is directed towards a direction vertical to the substrate surface. The magnetic layer 2 contains Co and Pt, and may contain an oxide, or Cr, B, Cu, Ta, Zr, and the like in order to enhance SNR properties.

Examples of the oxide contained in the magnetic layer 2 include $SiO_2$, SiO, $Cr_2O_3$, CoO, $Ta_2O_3$, $TiO_2$, and the like.

The magnetic layer 2 may be formed of one layer, or may be formed of a plurality of layers having different compositions.

For example, in a case where the magnetic layer 2 is formed of three layers of a first magnetic layer, a second magnetic layer, and a third magnetic layer, it is preferable that the first magnetic layer has a granular structure formed of a material containing Co, Cr, and Pt, and an oxide. For example, oxides of Cr, Si, Ta, Al, Ti, Mg, Co, and the like are preferably used as the oxide contained in the first magnetic layer. Among them, in particular, $TiO_2$, $Cr_2O_3$, $SiO_2$, and the like can be preferably used. In addition, it is preferable that the first magnetic layer is formed of a composite oxide in which two or more types of oxides are added. Among them, in particular, $Cr_2O_3$—$SiO_2$, $Cr_2O_3$—$TiO_2$, $SiO_2$—$TiO_2$, and the like can be preferably used.

The first magnetic layer can contain one or more types of elements selected from B, Ta, Mo, Cu, Nd, W, Nb, Sm, Tb, Ru, and Re in addition to Co, Cr, Pt, and an oxide.

The first magnetic layer contains the element described above, and thus, it is possible to accelerate refinement of magnetic particles or to improve crystallinity or orientation, and it is possible to obtain recording and reproducing properties suitable for higher density recording and thermal fluctuation properties.

The same material as that of the first magnetic layer can be used in the second magnetic layer. It is preferable that the second magnetic layer has a granular structure.

In addition, it is preferable that the third magnetic layer has a non-granular structure formed of a material which contains Co, Cr, and Pt, but does not contain an oxide. The third magnetic layer can contain one or more types of elements selected from B, Ta, Mo, Cu, Nd, W, Nb, Sm, Tb, Ru, Re, and Mn in addition to Co, Cr, and Pt. The third magnetic layer contains the elements described above in addition to Co, Cr, and Pt, and thus, it is possible to accelerate the refinement of the magnetic particles or to improve the crystalline or the orientation, and it is possible to obtain recording and reproducing properties and thermal fluctuation properties suitable for higher density recording.

It is preferable that the thickness of the magnetic layer 2 is 5 nm to 25 nm. In a case where the thickness of the magnetic layer 2 is less than the range described above, sufficient reproducing output is not able to be obtained, and thermal fluctuation properties also decrease. In addition, in a case where the thickness of the magnetic layer 2 is greater than the range described above, the magnetic particles in the magnetic layer 2 are enlarged, noise at the time of performing recording and reproducing increases, and recording and reproducing properties represented by a signal/noise ratio (an S/N ratio) or recording properties (OW) deteriorate. Therefore, setting the thickness of the magnetic layer 2 to be greater than the range described above is not preferable.

In a case where the magnetic layer 2 is formed of a plurality of layers, it is preferable that a non-magnetic layer is disposed between the adjacent magnetic layers. In a case where the magnetic layer 2 is formed of three layers of the first magnetic layer, the second magnetic layer, and the third magnetic layer, it is preferable that the non-magnetic layer is disposed between the first magnetic layer and the second magnetic layer and between the second magnetic layer and the third magnetic layer. By disposing the non-magnetic layer between the magnetic layers with a suitable thickness, magnetization reversal of each of the films is easily performed, and thus, it is possible to decrease the dispersion of the magnetization reversal of the entire magnetic particles, and it is possible to further improve the S/N ratio.

For example, Ru, a Ru alloy, a CoCr alloy, a CoCrX1 alloy (X1 represents at least one or two or more elements selected from Pt, Ta, Zr, Re, Ru, Cu, Nb, Ni, Mn, Ge, Si, O, N, W, Mo, Ti, V, Zr, and B.), and the like can be preferably used in the non-magnetic layer disposed between the magnetic layers.

It is preferable that an alloy material containing an oxide, a metal nitride, or a metal carbide is used in the non-magnetic layer disposed between the magnetic layers. Specifically, for example, $SiO_2$, $Al_2O_3$, $Ta_2O_5$, $Cr_2O_3$, MgO, $Y_2O_3$, $TiO_2$, and the like can be used as the oxide. For example, AlN, $Si_3N_4$, TaN, CrN, and the like can be used as the metal nitride. For example, TaC, BC, SiC, and the like can be used as the metal carbide.

It is preferable that the thickness of the non-magnetic layer disposed between the magnetic layers is 0.1 nm to 1 nm. By setting the thickness of the non-magnetic layer to be in the range described above, it is possible to further improve the S/N ratio.

The non-magnetic layer can be formed by a sputtering method.

In addition, in order to realize higher recording density, it is preferable that the magnetic layer 2 is a magnetic layer of vertical magnetic recording in which the easy axis of magnetization (remanence) is directed towards the vertical direction with respect to the substrate surface. The magnetic layer 2 may be a magnetic layer of in-plane magnetic recording.

The magnetic layer 2 may be formed by any known method of the related art such as a vapor deposition method, an ion beam sputtering method, and a magnetron sputtering method. The magnetic layer 2 is generally formed by a sputtering method.

(Protective Layer)

The protective layer 3 protects the magnetic layer 2. The protective layer 3 is formed of carbon nitride. The protective layer 3 includes the outermost surface (the outermost surface of the protective layer on the lubricant layer side, a boundary surface between the protective layer 3 and the lubricant layer 4, and outermost layer) containing carbon and nitrogen in orange of 10 atomic % to 90 atomic %. The nitrogen content in the protective layer 3 may be uniform, and for example, may have a concentration gradient in which the nitrogen content is the largest in the outermost surface and decreases as the depth is increased. The protective layer 3 may be formed of one layer, or may be formed of a plurality of layers.

In a case where the nitrogen content in the outermost surface of the protective layer 3 is in the range described above, a compound A and a compound B described below, which form the protective layer 3 and the lubricant layer 4, are bonded to each other with a high bonding force.

A nitrogen atom contained in the outermost surface of the protective layer 3 forms a strong bond with a hydroxyl group contained in the compound A and the compound B described below. In a case where the nitrogen content in the outermost surface of the protective layer 3 is greater than or equal to 10 atomic %, the nitrogen atom contained in the outermost surface of the protective layer 3 can sufficiently ensure the number of bondings with respect to the hydroxyl group contained in the compound A and the compound B, and the protective layer 3 is bonded to the lubricant layer 4 with a high bonding force. In order to ensure the number of bondings between the nitrogen atom contained in the protective layer 3 and the hydroxyl group contained in the compound A and the compound B, it is preferable that the nitrogen content in the outermost surface of the protective layer 3 is greater than or equal to 20 atomic %.

A carbon atom contained in the outermost surface of the protective layer 3 forms a strong bond with a six-membered ring ($-C_6H_4-$) contained in the compound A described below. In a case where the nitrogen content in the outermost surface of the protective layer 3 is less than or equal to 90 atomic %, the number of carbon atoms contained in the outermost surface of the protective layer 3 is sufficiently ensured. Therefore, the number of bondings between the carbon atom contained in the protective layer 3 and the six-membered ring contained in the compound A is sufficiently ensured, and the protective layer 3 is bonded to the lubricant layer 4 with a high bonding force. In order to ensure the number of bondings between the carbon atom contained in the protective layer 3 and the six-membered ring contained in the compound A, it is preferable that the nitrogen content in the outermost surface of the protective layer 3 is less than or equal to 80 atomic %.

In this embodiment, in a case where the nitrogen content in the protective layer 3 is uniform, the protective layer which includes the outermost surface on the lubricant layer side "containing carbon and nitrogen in a range of 10 atomic % to 90 atomic %" indicates a protective layer in which any one of the nitrogen content n the protective layer 3 calculated from a raw material used at the time of forming the protective layer 3, the nitrogen content in the protective layer 3 measured by using a known method, and the nitrogen content in the outermost surface of the protective layer 3 on the lubricant layer side measured by using a known method is in a range of 10 atomic % to 90 atomic %.

In addition, in a case where the nitrogen content in the protective layer 3 is not uniform, the protective layer including the outermost surface on the lubricant layer side "containing carbon and a nitrogen in a range of 10 atomic % to 90 atomic %" indicates a protective layer in which the nitrogen content in the outermost surface is in a range of 10 atomic % to 90 atomic % by measuring the surface of the protective layer on the lubricant layer side, for example, with an X-ray photoelectron spectroscopy (XPS/ESCA).

It is preferable that the film thickness of the protective layer 3 is in a range of 1 nm to 10 nm. In a case where the film thickness of the protective layer 3 is less than or equal to 10 nm, it is possible to sufficiently reduce magnetic spacing in the magnetic recording and reproducing apparatus including the magnetic recording medium 11 of this embodiment, and it is possible to correspond to further improvement in recording density. Furthermore, the magnetic spacing indicates a distance between the magnetic head and the magnetic layer 4. As the magnetic spacing becomes narrower, the electromagnetic conversion properties of the magnetic recording and reproducing apparatus can be improved. In a case where the film thickness of the protective layer 3 is greater than or equal to 1 nm, an effect of protecting the magnetic layer 2 increases, and durability can be improved.

The protective layer 3, for example, can be formed on the magnetic layer 2, by using a raw material containing carbon and nitrogen according to a sputtering method, a chemical vapor deposition (CVD) method, an ion beam vapor deposition (IBD) method, and the like. In this case, it is possible to setting the nitrogen content in the outermost surface of the protective layer to be in a range of 10 atomic % to 90 atomic % by controlling the concentration of the carbon and the nitrogen contained in the raw material.

The protective layer 3, for example, forms a carbon film (or a hydrogenated carbon film) by a known method of the related art, or may form the carbon film by performing nitriding processing (in a case of the hydrogenated carbon film, dehydrogenating processing and nitriding processing) with respect to the surface of the protective layer 3 on the lubricant layer 4 side. A known method can be used as a method of performing nitriding processing with respect to the surface of the carbon film (or performing dehydrogenating processing and nitriding processing with respect to the surface of the hydrogenated carbon film). Specifically, a method of injecting nitrogen ions into the carbon film or the hydrogenated carbon film, a method of exposing the carbon film or the hydrogenated carbon film to nitrogen plasma, and the like can be used. The protective layer 3 formed by the methods has a concentration gradient in which the nitrogen content is the largest in the outermost surface and decreases as the depth is increased.

(Lubricant Layer)

The lubricant layer 4 prevents the magnetic recording medium 11 from being contaminated, and reduces a frictional force of the magnetic head of the magnetic recording and reproducing apparatus sliding on the magnetic recording medium 11, and improves durability of the magnetic recording medium 11.

As described above, the present inventors have focused on the surface energy of the magnetic recording medium with respect to optimization of the material of the lubricant layer. Then, the lubricant layer capable of reducing $\gamma^{total}$ ($\gamma\gamma^{total}=\gamma^{AB}+\gamma^{LW}$) which is the total surface energy on the surface of the magnetic recording medium has been studied.

$\gamma^{AB}$ is surface energy established from a mutual interaction of Lewis acid-base. According to $\gamma^{AB}$, an equilibrium state of electrons existing in the protective layer and the lubricant layer can be estimated. In general, the protective layer (Lewis base) is a donor of the electrons, and the lubricant layer (Lewis acid) is an acceptor of the electrons. A low value of $\gamma^{AB}$ indicates a state where a mutual interaction between the protective layer and the lubricant layer is sufficiently expressed. Therefore, the low value of $\gamma^{AB}$ can indicate that bonding properties between the lubricant layer and the protective layer are high.

$\gamma^{LW}$ is surface energy indicating a London dispersion force or a Van der Waals force from Dipole-Dipole quantum theory. The dispersion properties of the compound forming the lubricant layer can be estimated from $\gamma^{LW}$. A low value of $\gamma^{LW}$ indicates a state where the covering properties of the lubricant layer are sufficiently expressed. Therefore, the low value of $\gamma^{LW}$ can indicate that a large effect of preventing the protective layer from being exposed (a large coating ratio).

$\gamma^{AB}$ and $\gamma^{LW}$ are calculated in the following sequence. First, a contact angle on the protective layer of the magnetic recording medium is measured by using three types of solvents (a solvent A, a solvent B, and a solvent C).

The contact angle can be measured by a known method. That is, a certain amount of solvent is dripped onto the surface of the protective layer of the magnetic recording medium, and an angle between a water droplet and the surface of the protective layer after a certain period of time has elapsed is measured by using a contact angle meter.

Furthermore, in the present invention, water is used as the solvent A, Methylene Iodide is used as the solvent B, and Ethylene Glycol is used as the solvent C. A contact angle in a case of using the solvent A is set to $\theta_A$, a contact angle in a case of using the solvent B is set to $\theta_B$, and a contact angle in a case of using the solvent C is set to $\theta_C$.

An expression and parameters for calculating $\gamma^{AB}$ and $\gamma^{LW}$ are as described below.

In the following expressions, a numeric character 1 in a symbol such as "$\gamma_1^+$" indicates a parameter of a solvent, and a numeric character 2 in a symbol such as "$\gamma_2^+$" indicates a parameter of a lubricant. In addition, "+" in a symbol such as "$\gamma_1^+$" indicates a parameter which indicates contribution of electron accepting properties of a Van Oss method, and "−" in a symbol such as "$\gamma_1^-$" indicates a parameter which indicates contribution of electron donating properties of the Van Oss method.

$\gamma^{total}$, $\gamma^{AB}$, and $\gamma^{LW}$ are obtained by analyzing the following simultaneous equation using the solvent A to the solvent C of which $\gamma_1$, $\gamma_1^{LW}$, $\gamma_1^+$, and $\gamma_1^-$ are known.

$\gamma^{AB} = 2(\gamma_1^+ \gamma_2^-)^{1/2} + 2(\gamma_1^- \gamma_2^+)^{1/2}$ $\gamma^{LW} = 2(\gamma_1^{LW} \gamma_2^{LW})^{1/2}$ $\gamma_{1A}(1 + \cos\theta_A) = 2(\gamma_{1A}^{LW}\gamma_2^{LW})^{1/2} + 2(\gamma_{1A}^+\gamma_2^-)^{1/2} + 2(\gamma_{1A}^-\gamma_2^+)^{1/2}$ $\gamma_{1B}(1 + \cos\theta_B) = 2(\gamma_{1B}^{LW}\gamma_2^{LW})^{1/2} + 2(\gamma_{1B}^-\gamma_2^-)^{1/2} + 2(\gamma_{1B}^-\gamma_2^+)^{1/2}$ $\gamma_{1C}(1 + \cos\theta_C) = 2(\gamma_{1C}^{LW}\gamma_2^{LW})^{1/2} + 2(\gamma_{1C}^-\gamma_2^-)^{1/2} + 2(\gamma_{1C}^-\gamma_2^+)^{1/2}$ Water: $\gamma_{1A} = 72.8$, $\gamma_{1A}^{LW} = 21.8$, $\gamma_{1A}^+ = 25.5$, and $\gamma_{1A}^- = 25.5$
Methylene Iodide: $\gamma_{1B} = 50.8$, $\gamma_{1B}^{LW} = 50.8$, $\gamma_{1B}^+ = 0$, and $\gamma_{1B}^- = 0$
Ethylene Glycol: $\gamma_{1C} = 48.0$, $\gamma_{1C}^{LW} = 29.0$, $\gamma_{1C}^+ = 1.92$, and $\gamma_{1C}^- = 47.0$ In the lubricant layer of the magnetic recording medium in this embodiment, it is preferable that the total surface energy ($\gamma^{total}$) on the surface of the magnetic recording medium which is calculated by the method described above is less than or equal to 26.3 mJ/m². The total surface energy ($\gamma^{total}$) is preferably less than or equal to 25.0 mJ/m², and is more preferably less than or equal to 24.0 mJ/m². In a case where the surface energy ($\gamma^{total}$) is less than or equal to 26.3 mJ/m², the magnetic recording medium is obtained in which the surface of the protective layer is covered with the lubricant layer with a high coating ratio and high bonding properties.

In the magnetic recording medium 11 of this embodiment, the lubricant layer 4 is formed by being in contact with the outermost surface of the protective layer 3.

The lubricant layer 4 contains the compound A represented in the below general formula (1) which has an average molecular weight in a range of 1,500 to 2,000, and the compound B represented in the below general formula (2) which has an average molecular weight in a range of 1,300 to 2,400. The compound A has a preferred number of OH functional groups and six-membered rings, and an average molecular weight in a preferred range. In addition, the compound B has a preferred number of OH functional groups, and has an average molecular weight in a preferred range. Accordingly, in the lubricant layer 4 in which the compounds A and B are mixed at a preferred mass ratio, and the surface of the protective layer is covered with a high coating ratio and high bonding properties, a film thickness reduction ratio is low and environment resistance is high under a high temperature and high humidity environment.

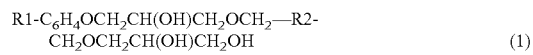

(In general formula (1), R1 is an alkoxy group having 1 to 4 carbon atoms. R2 is —CF$_2$O(CF$_2$CF$_2$O)x(CF$_2$O) yCF$_2$— (an order in parentheses of x and y may be this order, the opposite order, or a random order (each of x and y is a real number of 0 to 15)).)

(In General Formula (2), m is an integer.)

[Compound A]

The compound A represented in the above general formula (1) mainly contributes to the improvement in the covering properties of the lubricant layer 4 on the surface of the protective layer 3. The lubricant layer 4 contains the compound A, and thus, the value of $\gamma^{LW}$ decreases, and the surface energy ($\gamma^{total}$) easily decreases.

In the compound A, the six-membered ring (—C$_6$H$_4$—) having a large cyclic skeleton which is arranged in a position close to a terminal forms a strong bond with the carbon atom contained in the outermost surface of the protective layer 3. In addition, in the compound. A, a terminal group formed of —CH(OH)CH$_2$OH having two hydroxyl groups positioned on a terminal on a side opposite to R1 and another hydroxyl group for a strong bond with the nitrogen atom contained in the outermost surface of the protective layer 3. The compound A is bonded onto the outermost surface of the protective layer 3 in a position closed to one terminal and the other terminal, and thus, is easily arranged over a surface direction, has excellent covering properties with respect to the protective layer 3, and has excellent bonding properties.

In the compound A represented in the above general formula (1), R1 is an alkoxy group having 1 to 4 carbon atoms. R1 is an alkoxy group having 1 to 4 carbon atoms, and thus, the six-membered ring (—C$_6$H$_4$—) contained in the compound A is arranged in the position close to the terminal of the compound A. As the number of carbon atoms of R1 in the compound A decreases, the position of the six-membered ring becomes the position closed to the terminal and the position of the six-membered ring is separated from the terminal group formed of —CH(OH) CH$_2$OH. As a result thereof, the compound A easily spreads on the outermost surface of the protective layer 3 in the surface direction, and the covering properties are improved. Therefore, in R1 in the compound A, it is preferable that the number of carbon atoms decreases, and it is most preferable that the number of carbon atoms is 1.

In the compound A represented in the above general formula (1), each of x and y in R2 is a real number of 0 to 15, and is preferably a real number of 3 to 7. The average molecular weight of each of x and y in R2 is adjusted to be in a range of 1,500 to 2,000.

The lubricant layer 4 has excellent stability under a high temperature and high humidity environment as the average molecular weight of the compound A increases, and the thickness of the lubricant layer 4 rarely decreases due to the deterioration of the compound A. The average molecular weight of the compound A is greater than or equal to 1,500, and thus, a decrease in the thickness of the lubricant layer 4 due to use under a high temperature and high humidity environment can be suppressed, and excellent durability can be obtained. In a case where the average molecular weight of the compound A is greater than 1,800, the lubricant layer 4 having more excellent corrosion resistance can be obtained. In addition, the average molecular weight of the compound A is less than or equal to 2,000, and thus, viscosity is suppressed, the lubricant layer 4 is rarely in the shape of an island or a mesh, and excellent covering properties can be obtained.

As disclosed in Japanese Unexamined Patent Application, First Publication No. 2013-163667, the compound A represented in the above general formula (1), for example, can he obtained by allowing straight-chain fluoropolyether having a hydroxyl group on one terminal and a hydroxy alkyl group on the other terminal to react with a phenoxy compound having an epoxy group.

Examples of a commercially available compound A include ART-1 (Product Name: manufactured by MORESCO Corporation). In ART-1 (Product Name), R1 in general formula (1) is an alkoxy group having 1 carbon atom, and each of x and y in R2 is a real number of 3 to 7, and is adjusted such that the average molecular weight is in a range of 1,500 to 2,000.

[Compound B]

The compound B represented in the above general formula (2) mainly contributes to a bonding force between the protective layer and the lubricant layer. The lubricant layer contains the compound B, and thus, the value of $\gamma^{AB}$ decreases, and the surface energy ($\gamma^{total}$) easily decreases.

The compound B has three hydroxyl groups, in which a terminal group formed of —CH(OH)CH$_2$OH having two hydroxyl groups is arranged on one terminal, and a terminal group formed of —CH$_2$OH having one hydroxyl group is arranged on the other terminal. Three hydroxyl groups in total, which are arranged on one terminal or the other terminal of the compound B, form a strong bond with the nitrogen atom in the outermost surface of the protective layer 3. In the compound B, three hydroxyl groups in total, which are arranged on one terminal or the other terminal of the compound B, are bonded onto the outermost surface of the protective layer 3, and thus, the compound B has excellent bonding properties with respect to protective layer 3.

In the compound B represented in the above general formula (2), m is an integer. In is adjusted such that the average molecular weight is in orange of 1,300 to 2,400.

The lubricant layer 4 has excellent stability under a high temperature and high humidity environment as the average molecular weight of the compound B increases, and the thickness of the lubricant layer 4 rarely decreases due to the deterioration of the compound B. The average molecular weight of the compound B is greater than or equal to 1,300, and thus, a decrease in the thickness of the lubricant layer 4 due to use under a high temperature and high humidity environment can be suppressed, and excellent durability can be obtained. In a case where the average molecular weight of the compound B is greater than 1,700, the lubricant layer 4 having more excellent corrosion resistance can be obtained. In addition, the average molecular weight of the compound B is less than or equal to 2,400, and thus, viscosity is suppressed, the lubricant layer 4 is rarely in the shape of an island or a mesh, and excellent covering properties can be obtained.

Examples of a commercially available compound. B include D3OH (Product Name: manufactured by MORESCO Corporation). In D3OH (Product Name), the value of m in General Formula (3) is adjusted such that the average molecular weight is in a range of 1,300 to 2,400.

(Mass Ratio (A/B))

In the lubricant layer 4, a mass ratio (A/B) of the compound A represented in the above general formula (1) with respect to the compound B represented in the above general formula (2) is in a range of 0.2 to 3.0, and is preferably in a range of 0.25 to 2.3. The mass ratio (A/B) is in a range of 0.2 to 3.0, and thus, as described below, the lubricant layer 4 having excellent covering properties and excellent bonding properties with respect to the protective layer 3 is obtained. As a result thereof, it is possible to prevent the magnetic recording medium 11 from being contaminated due to entering of the environment substance from the gap of the lubricant layer 4.

That is, in a case where the mass ratio (A/B) is in orange of 0.2 to 3.0, the surface energy ($\gamma^{total}$) of the lubricant layer 4 decreases, and the lubricant layer 4 is rarely in the shape of an island or a mesh. In addition, it is possible to ensure the number of bondings between the nitrogen atom contained in the outermost surface of the protective layer 3 and the hydroxyl group contained in the compound A and the compound B, and it is possible to sufficiently ensure the number of bondings between the carbon atom contains in the outermost surface of the protective layer 3 and the six-membered ring contained in the compound A. Accordingly, the protective layer 3 is bonded to the lubricant layer 4 with a high bonding force. In addition, a gap formed between the compounds A is filled with a sufficient amount of compound B. More specifically, the compound A has a large cyclic skeleton, and thus, the compound A is arranged over the surface direction, and is easily in the shape of a mesh. Accordingly, a gap is easily formed between the compounds A. In contrast, the compound B does not have a cyclic skeleton but has a straight chain. For this reason, the compound B enters the gap formed between the compounds A, and thus, the gap between the compounds A is filled with the compound B.

In a case where the mass ratio (A/B) is greater than 3.0, the compound B becomes insufficient, and thus, the lubricant layer 4 is in the shape of a mesh, and the covering properties with respect to the protective layer 3 becomes insufficient. In addition, in a case that the mass ratio (A/B) is less than 0.2, the compound B increases, a bonding force between the carbon atom configuring the protective layer 3 and a lubricant decreases, the lubricant layer 4 is in the shape of an island, and the covering properties with respect to the protective layer 3 becomes insufficient.

(Film Thickness of Lubricant Layer)

The average film thickness of the lubricant layer 4 is in a range of 0.5 nm (5 Å) to 2 nm (20 Å), and is preferably in a range of 1 nm to 1.9 nm.

The average film thickness of the lubricant layer 4 is greater than or equal to 0.5 nm, and thus, the lubricant layer 4 is not in the shape of an island or a mesh, and high covering properties and high bonding properties with respect to the surface of the protective layer 3 can be maintained for a long period of time. The value of $\gamma^{AB}$ and $\gamma^{LW}$ decreases as the average film thickness of the lubricant layer 4 becomes greater, and thus, the surface energy ($\gamma^{total}$) decreases. Therefore, the surface of the protective layer 3 can be covered with the lubricant layer 4 with a high covering properties and high bonding properties as the average film thickness of the lubricant layer 4 becomes greater, and durability becomes excellent. In addition, the average film thickness of the lubricant layer 4 is less than or equal to 2 nm, and thus, it is possible to sufficiently decrease the floating amount of the magnetic head, and it is possible to increase the recording density of the magnetic recording medium 11.

(Formation Method of Lubricant Layer)

A magnetic recording medium in the middle of the manufacturing is prepared in which each of the layers up to the protective layer 3 is formed on the nonmagnetic substrate 1, a solution for forming a lubricant layer is applied onto the protective layer 3 of the magnetic recording medium in the middle of the manufacturing, and thus, the lubricant layer 4, for example, can be formed on the protective layer 3.

The solution for forming a lubricant layer, for example, can be obtained by mixing the compound A and the compound B such that the mass ratio (A/B) of the compound A with respect to the compound B is in the range described above, by diluting the mixture with a solvent, and by setting viscosity and concentration to be suitable for a coating method.

Examples of the solvent used in the solution for forming a lubricant layer include a fluorine-based solvent such as Vertrel XF (product name, manufactured by Du Pont-Mitsui Fluorochemicals Co., Ltd.), and the like.

A coating method of the solution for forming a lubricant layer is not particularly limited, and examples of the coating method include a spin coating method, a dipping method, and the like.

Examples of a dipping method include a method in which the nonmagnetic substrate 1 on which each of the layers up to the protective layer 3 is formed is dipped in the solution for forming a lubricant layer which is put into a dipping tank of a dip coating device, and after that, the nonmagnetic substrate 1 is pulled up from the dipping tank at a predetermined speed. By using the dipping method, it is possible to uniformly apply the solution for forming a lubricant layer onto the surface of the protective layer 3 of the nonmagnetic substrate 1, and it is possible to form the lubricant layer 4 on the protective layer 3 with a uniform film thickness.

The magnetic recording medium 11 of this embodiment includes at least the magnetic layer 2, the protective layer 3, and the lubricant layer 4 on the nonmagnetic substrate 1 in this order. Then, the outermost surface of the protective layer 3 on the lubricant layer 4 side contains carbon and nitrogen in a range of 10 atomic % to 90 atomic %, the lubricant layer 4 contains the compound A and the compound B, and the mass ratio (A/B) of the compound A with respect to the compound B is in a range of 0.2 to 3.0. Accordingly, the lubricant layer 4 is obtained in which even in a case where the average film thickness is a sufficiently thin thickness of 0.5 nm to 2 nm, the surface energy ($\gamma^{total}$) decreases, and high covering properties and high bonding properties with respect to the surface of the protective layer can be maintained for a long period of time. Specifically, in the magnetic recording medium 11 of this embodiment, in a case where the lubricant layer 4 is retained under a high temperature and high humidity environment of a temperature of 65° C. and humidity of 80% for 3 weeks, the reduction ratio of the film thickness of the lubricant layer 4 is less than or equal to 3%, and environment resistance becomes excellent.

Accordingly, in the magnetic recording medium 11 of this embodiment, it is possible to prevent the magnetic recording medium 11 from being contaminated due to coagulation of ion components existing in the lower layer of the lubricant layer 4 by the environment substance entering the lower layer of the lubricant layer 4 from the gap of the lubricant layer 4.

In addition, the magnetic recording medium 11 of this embodiment includes the lubricant layer 4 which can effectively prevent the surface of the magnetic recording medium 11 from being contaminated even in a case where the lubricant layer 4 is thin, and thus, it is possible to realize further improvement in recording density by sufficiently thinning the lubricant layer 4.

In addition, even in a case where the magnetic recording medium 11 of this embodiment is used under a high temperature and high humidity environment in which the magnetic recording medium 11 is more significantly contaminated, the magnetic recording medium 11 is rarely contaminated, and has excellent environmental resistance, and has stable magnetic recording and reproducing properties for a long period of time.

[Magnetic Recording and Reproducing Apparatus]

Figure 2:
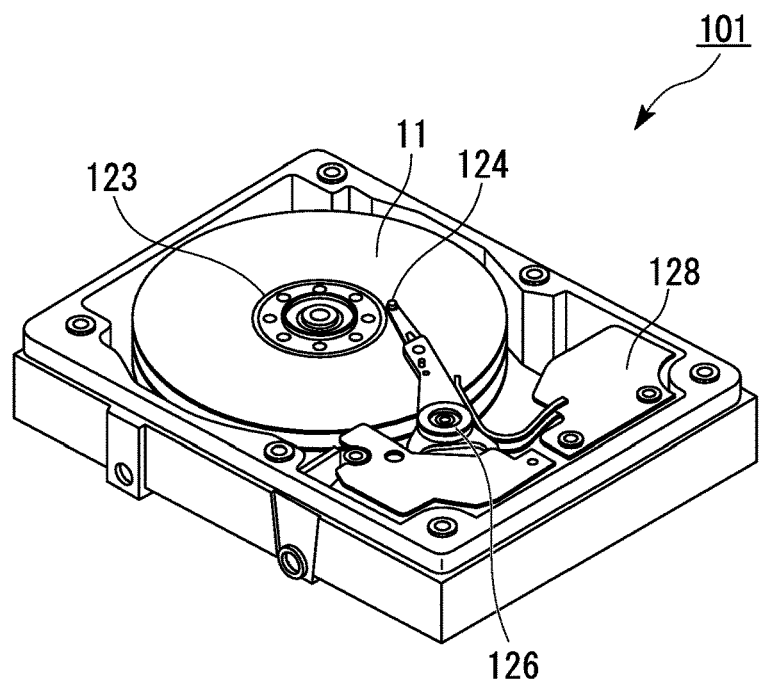
FIG. 2 is a perspective view illustrating an example of a magnetic recording and reproducing apparatus of the present invention.

Next, an example of the magnetic recording and reproducing apparatus of this embodiment will be described. FIG. 2 is a perspective view illustrating an example of a magnetic recording and reproducing apparatus which is an embodiment of the present invention.

A magnetic recording and reproducing apparatus 101 of this embodiment includes the magnetic recording medium 11 illustrated in FIG. 1, a medium-driving unit 123, a magnetic head 124, a head-moving unit 126, and a recording and reproducing signal-processing unit 128.

The medium-driving unit 123 drives the magnetic recording medium 11 in a recording direction. The magnetic head 124 includes a recording unit and a reproducing unit, and has functions of recording information to the magnetic recording medium 11 and of reproducing information from the magnetic recording medium 11. Specifically, the recording unit records information to the magnetic recording medium 11, and the reproducing unit reproduces information from the magnetic recording medium 11. The head-moving unit 126 moves the magnetic head 124 relative to the magnetic recording medium 11. The recording and reproducing signal-processing unit 128 processes a recording signal transmitted to the magnetic head 124 and a reproducing signal received from the magnetic head 124.

In a magnetic recording and reproducing apparatus 101 of this embodiment, the surface of the protective layer 3 is covered by the lubricant layer 4 having a sufficiently thin thickness with high covering properties and high bonding properties for a long period of time, and thus, the magnetic recording medium 11 is included in which contaminants existing on the magnetic recording medium decrease. Therefore, recording and reproducing properties are prevented from decreasing or floating stability is prevented from deteriorating over a long period of time by transferring the contaminants existing on the magnetic recording medium 11 to the magnetic head 124 of the magnetic recording and reproducing apparatus 101. Accordingly, the magnetic recording and reproducing apparatus 101 of the present invention has stable magnetic recording and reproducing properties.

EXAMPLES

Hereinafter, the present invention will be described in detail on the basis of examples. Furthermore, the present invention is not limited to the examples, but can be performed in conditions suitably selected in a range not changing the gist of the present invention.

Example

A glass substrate (manufactured by HOYA Corporation, and an external dimension of 2.5 inches) which has been washed was contained in a film forming chamber of a DC magnetron sputtering device (C-3040, manufactured by Canon Anelva Corporation), and the film forming chamber was exhausted until the ultimate vacuum became $1\times10^{-5}$ Pa.

After that, an adhesive layer having a layer thickness of 10 nm was formed on the glass substrate by a sputtering method using a Cr target.

Subsequently, a soft magnetic underlayer was formed on the adhesive layer by a sputtering method. A first soft magnetic layer, an intermediate layer, and a second soft magnetic layer were formed as the soft magnetic underlayer. First, the first soft magnetic layer having a layer thickness of 25 nm was formed by using a Co-20Fe-5Zr-5Ta target {a Fe content of 20 atomic %, a Zr content of 5 atomic %, a Ta content of 5 atomic %, and residual Co} at a substrate temperature of lower than or equal to 100° C. Next, the intermediate layer formed of Ru of which the layer thickness was 0.7 nm was formed on the first soft magnetic layer. After that, the second soft magnetic layer formed of Co-20Fe-5Zr-5Ta of which the layer thickness was 25 nm was formed on the intermediate layer.

Next, a seed layer having a layer thickness of 5 nm was formed on the soft magnetic underlayer by a sputtering method using a Ni-6W target {a W content of 6 atomic % and residual Ni}.

After that, a Ru layer having a layer thickness of 10 nm was formed on the seed layer as a first orientation control layer by a sputtering method at a sputtering pressure of 0.8 Pa. Next, a Ru layer having a layer thickness of 10 nm was formed on the first orientation control layer as a second orientation control layer by using a sputtering method at a sputtering pressure of 1.5 Pa.

Subsequently, a first magnetic layer formed of 91(Co15Cr16Pt)-6($SiO_2$)-3($TiO_2$) {a Cr content of 15 atomic %, a Pt content of 16 atomic %, an alloy of residual Co of 91 mol %, an oxide formed of $SiO_2$ of 6 mol %, and an oxide formed of $TiO_2$ of 3 mol %} of which the layer thickness was 9 nm was formed on the second orientation control layer by a sputtering method at a sputtering pressure of 2 Pa.

Next, a non-magnetic layer formed of 88(Co30Cr)-12($TiO_2$) {a Cr content of 30 atomic %, an alloy of residual Co of 88 mol %, and an oxide formed of $TiO_2$ of 12 mol %} of which the layer thickness was 0.3 nm was formed on the first magnetic layer by a sputtering method.

After that, a second magnetic layer formed of 92(Co11Cr18Pt)-5($SiO_2$)-3($TiO_2$) {a Cr content of 11 atomic %, a Pt content of 18 atomic %, an alloy of residual Co of 92 mol %, an oxide formed of $SiO_2$ of 5 mol %, and an oxide formed of $TiO_2$ of 3 mol %} of which the layer thickness was 6 nm was formed on the non-magnetic layer by a sputtering method at a sputtering pressure of 2 Pa.

After that, a non-magnetic layer formed of Ru of which the layer thickness was 0.3 nm was formed on the second magnetic layer by a sputtering method.

Subsequently, a third magnetic layer having a layer thickness of 7 nm was formed on the non-magnetic layer by a sputtering method using a Co-20Cr-14Pt-3B target {a Cr content of 20 atomic %, a Pt content of 14 atomic %, a B content of 3 atomic %, and residual Co} at a sputtering pressure of 0.6 Pa.

Next, a protective layer formed of carbon nitride (a nitrogen content of 20 atomic %) of which the layer thickness was 3 nm was formed by an ion beam method.

Next, the following compounds shown in Table 1 were dissolved in a solvent described below, and thus, a solution for forming a lubricant layer was prepared. Then, the obtained solution for forming a lubricant layer was put into a dipping tank of a dip coating device, and the nonmagnetic substrate on which each of the layers up to the protective layer was formed was dipped in the solution. After that, the nonmagnetic substrate was pulled out from the dipping tank at a constant speed, and thus, the surface of the protective layer on the nonmagnetic substrate was coated with the solution for forming a lubricant layer, and a lubricant layer was formed. According to the steps described above, magnetic recording mediums of Example 1 to Example 13 and Comparative Example 1 to Comparative Example 6 were obtained.

[Compound A]
ART-1 (Product Name: manufactured by MORESCO Corporation) having an average molecular weight of approximately 1,700

[Compound B]
D3OH (product Name: manufactured by MORESCO Corporation) having an average molecular weight of approximately 1,900

[Other Compounds]
D4OH (Product Name: manufactured b MORESCO Corporation)

In D4OH, p of General Formula (3) described below is in a range of 4 to 30, and the average molecular weight is approximately 2,500.

[Solvent]
Vertrel XF (product name: manufactured by Du Pont-Mitsui Fluorochemicals Co., Ltd.)

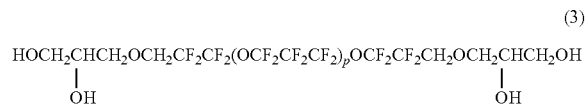

(3)

(In General Formula (3), p is in a range of 4 to 30.)

In the magnetic recording mediums of Example 1 to Example 13 and Comparative Example 1 to Comparative Example 6, the average film thickness of the lubricant layer was measured by Fourier transformation infrared spectroscopy (FT-IR).

The results are shown in Table 1.

In addition, a mass ratio (A:B) of the compound A and the compound B contained in the lubricant layer, and a mass ratio (A/B) of the compound A with respect to the compound B are shown in Table 1.

In addition, in the magnetic recording mediums of Example 1 to Example 13 and Comparative Example 1 to Comparative Example 6, evaluation was performed by measuring $\gamma^{AB}$ (bonding properties) and $\gamma^{LW}$ (covering properties) of the lubricant layer using the method described above, and by calculating ($\gamma^{total}(\gamma^{AB}+\gamma^{LW})$). In measurement of a contact angle on the surface (on the protective layer) of the magnetic recording medium, three types of solvents of water, methylene iodide, and ethylene glycol were used as a solvent. The evaluation results are shown in Table 1.

In addition, the magnetic recording mediums of Example 1 to Example 13 and Comparative Example 1 to Comparative Example 6 were retained under a high temperature and high humidity environment of a temperature of 65° C. and humidity of 80% for 3 weeks, and the average film thickness of the lubricant layer was measured by using FT-IR. After that, a reduction ratio of the film thickness was calculated by using the average film thickness of the lubricant layer before and after being retained under a high temperature and high humidity environment. The results are shown in Table 1.

thus, the surface energy ($\gamma^{total}(\gamma^{AB}+\gamma^{LW})$) increased. For this reason, it is assumed that the coating ratio and the bonding properties of the lubricant layer with respect to the surface of the protective layer become insufficient, and the reduction ratio of the film thickness of the lubricant layer is greater than 3%.

In addition, in Comparative Example 4, the compound B was not contained, and in Comparative Example 5, the compound A was not contained, and thus, the surface energy ($\gamma^{total}(\gamma^{AB}+\gamma^{LW})$) increased. For this reason, it is assumed

TABLE 1

| | Lubricant | | | | | | Evaluation | | | |
|---|---|---|---|---|---|---|---|---|---|---|
| | | | | | | Average Film Thickness (nm) | $\gamma^{AB}$ | $\gamma^{LW}$ | $\gamma^{AB} + \gamma^{LW}$ ($\gamma^{total}$) | Reduction Ratio of Film Thickness under High Temperature and High Humidity Environment (%) |
| | Compound A | Compound B | Other Compounds | A:B | A/B | | | | | |
| Example 1 | ART-1 | D3OH | | 4:6 | 0.67 | 1 | 4.41 | 21.30 | 25.71 | 2.8 |
| Example 2 | ART-1 | D3OH | | 5:5 | 1.0 | 1 | 4.07 | 21.16 | 25.23 | 2.7 |
| Example 3 | ART-1 | D3OH | | 6:4 | 1.5 | 1 | 4.62 | 21.43 | 26.05 | 2.9 |
| Example 4 | ART-1 | D3OH | | 5:5 | 1 | 1.2 | 4.63 | 20.19 | 24.82 | 2.7 |
| Example 5 | ART-1 | D3OH | | 5:5 | 1 | 1.4 | 4.54 | 19.56 | 24.10 | 2.7 |
| Example 6 | ART-1 | D3OH | | 5:5 | 1 | 1.6 | 4.41 | 19.25 | 23.66 | 2.6 |
| Example 7 | ART-1 | D3OH | | 5:5 | 1 | 1.8 | 4.37 | 18.92 | 23.29 | 2.6 |
| Example 8 | ART-1 | D3OH | | 5:5 | 1 | 2 | 4.32 | 18.83 | 23.15 | 2.6 |
| Example 9 | ART-1 | D3OH | | 3:7 | 0.43 | 1 | 4.42 | 20.99 | 25.41 | 2.8 |
| Example 10 | ART-1 | D3OH | | 2:8 | 0.25 | 1 | 4.37 | 21.09 | 25.46 | 2.8 |
| Example 11 | ART-1 | D3OH | | 7:3 | 2.3 | 1 | 4.73 | 20.37 | 25.10 | 2.8 |
| Example 12 | ART-1 | D3OH | | 5:5 | 1 | 0.8 | 4.76 | 21.44 | 26.20 | 2.9 |
| Example 13 | ART-1 | D3OH | | 3:1 | 3 | 1 | 5.06 | 21.09 | 26.15 | 2.9 |
| Comparative Example 1 | ART-1 | D3OH | | 8:2 | 4 | 1 | 5.88 | 21.19 | 27.07 | 3.1 |
| Comparative Example 2 | ART-1 | D3OH | | 2:11 | 0.18 | 1 | 4.44 | 21.93 | 26.37 | 3.0 |
| Comparative Example 3 | ART-1 | D3OH | | 5:5 | 1 | 0.6 | 6.92 | 27.08 | 34.00 | 3.7 |
| Comparative Example 4 | ART-1 | | | | | 1 | 10.8 | 22.06 | 32.86 | 3.6 |
| Comparative Example 5 | | D3OH | | | | 1 | 4.52 | 23.11 | 27.63 | 3.1 |
| Comparative Example 6 | | | D4OH | | | 1 | 6.19 | 21.08 | 27.27 | 3.2 |

As shown in Table 1, in the magnetic recording mediums of Example 1 to Example 13, the total surface energy ($\gamma^{total}(\gamma^{AB}+\gamma^{LW})$) of the surface of the magnetic recording medium was low, compared to the magnetic recording mediums of Comparative Example 1 to Comparative Example 6. In addition, in the magnetic recording mediums, the reduction ratio of the film thickness of the lubricant layer under a high temperature and high humidity environment was less than or equal to 3%, and high environment resistance was obtained. It is assumed that the results are obtained since the lubricant layer of the magnetic recording mediums of Example 1 to Example 13 has excellent covering properties and excellent bonding properties with respect to the protective layer.

In contrast, in Comparative Example 1, the amount of compound A was excessively large, and in Comparative Example 2, the amount of compound B was excessively large, and thus, the surface energy ($\gamma^{total}(\gamma^{AB}+\gamma^{LW})$) increased. For this reason, it is assumed that the coating ratio and the bonding properties of the lubricant layer with respect to the surface of the protective layer become insufficient, and the reduction ratio of the film thickness of the lubricant layer is greater than 3%.

In addition, in Comparative Example 3, the average film thickness of the lubricant layer was excessively thinned, and that the coating ratio and the bonding properties of the lubricant layer with respect to the surface of the protective layer become insufficient, and the reduction ratio of the film thickness of the lubricant layer is greater than 3%.

In addition, in Comparative Example 6, the compound is a lubricant having four OH groups, and thus, the surface energy ($\gamma^{total}(\gamma^{AB}+\gamma^{LW})$) increased. For this reason, it is assumed that the coating ratio and the bonding properties of the lubricant layer with respect to the surface of the protective layer become insufficient, and the reduction ratio of the film thickness of the lubricant layer is greater than 3%.

The magnetic recording medium and the magnetic recording and reproducing apparatus of the present invention can be used in the industry of using and manufacturing a magnetic recording medium and a magnetic recording and reproducing apparatus having high recording density.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: NONMAGNETIC SUBSTRATE
2: MAGNETIC LAYER
3: PROTECTIVE LAYER
4: LUBRICANT LAYER
11: MAGNETIC RECORDING MEDIUM
101: MAGNETIC RECORDING AND REPRODUCING APPARATUS
123: MEDIUM-DRIVING UNIT
124: MAGNETIC HEAD
126: HEAD-MOVING UNIT
128: RECORDING AND REPRODUCING SIGNAL-PROCESSING UNIT

What is claimed is:

1. A magnetic recording medium comprising at least a magnetic layer, a protective layer, and a lubricant layer on a nonmagnetic substrate in this order,
wherein an outermost surface of the protective layer on the lubricant layer side contains carbon and nitrogen in a range of 10 atomic % to 90 atomic %,
the lubricant layer is formed by being in contact with the outermost surface, has an average film thickness of 0.5 nm to 2 nm, and contains a compound A represented in the below general formula (1) which has an average molecular weight in a range of 1,500 to 2,000 and a compound B represented in the below general formula (2) which has an average molecular weight in a range of 1,300 to 2,400, and
a mass ratio (A/B) of the compound A with respect to the compound B is in a range of 0.2 to 3.0, $$R1\text{-}C_6H_4OCH_2CH(OH)CH_2OCH_2\text{-}R2\text{-}CH_2OCH_2CH(OH)CH_2OH \quad (1)$$

in the general formula (1), R1 is an alkoxy group having 1 to 4 carbon atoms, R2 is $-CF_2O(CF_2CF_2O)x(CF_2O)yCF_2-$ (an order in parentheses of x and y may be this order, the opposite order, or a random order (each of x and y is a real number of 0 to 15).

$$HOCH_2CF_2CF_2O(CF_2CF_2CF_2O)mCF_2CF_2CH_2OCH_2CH(OH)CH_2OH \quad (2)$$

in the general formula (2), m is an integer.

2. A magnetic recording and reproducing apparatus, comprising:
the magnetic recording medium according to claim 1;
a medium-driving unit that drives the magnetic recording medium in a recording direction;
a magnetic head that records information to the magnetic recording medium and reproduces information from the magnetic recording medium;
a head-moving unit that moves the magnetic head relative to the magnetic recording medium; and
a recording and reproducing signal-processing unit that processes a recording signal transmitted to the magnetic head and a reproducing signal received from the magnetic head.

\* \* \* \* \*